E. A. HAMWI.
PASTRY CONE MACHINE.
APPLICATION FILED MAR. 13, 1915.
1,281,159.
Patented Oct. 8, 1918.
4 SHEETS—SHEET 1.
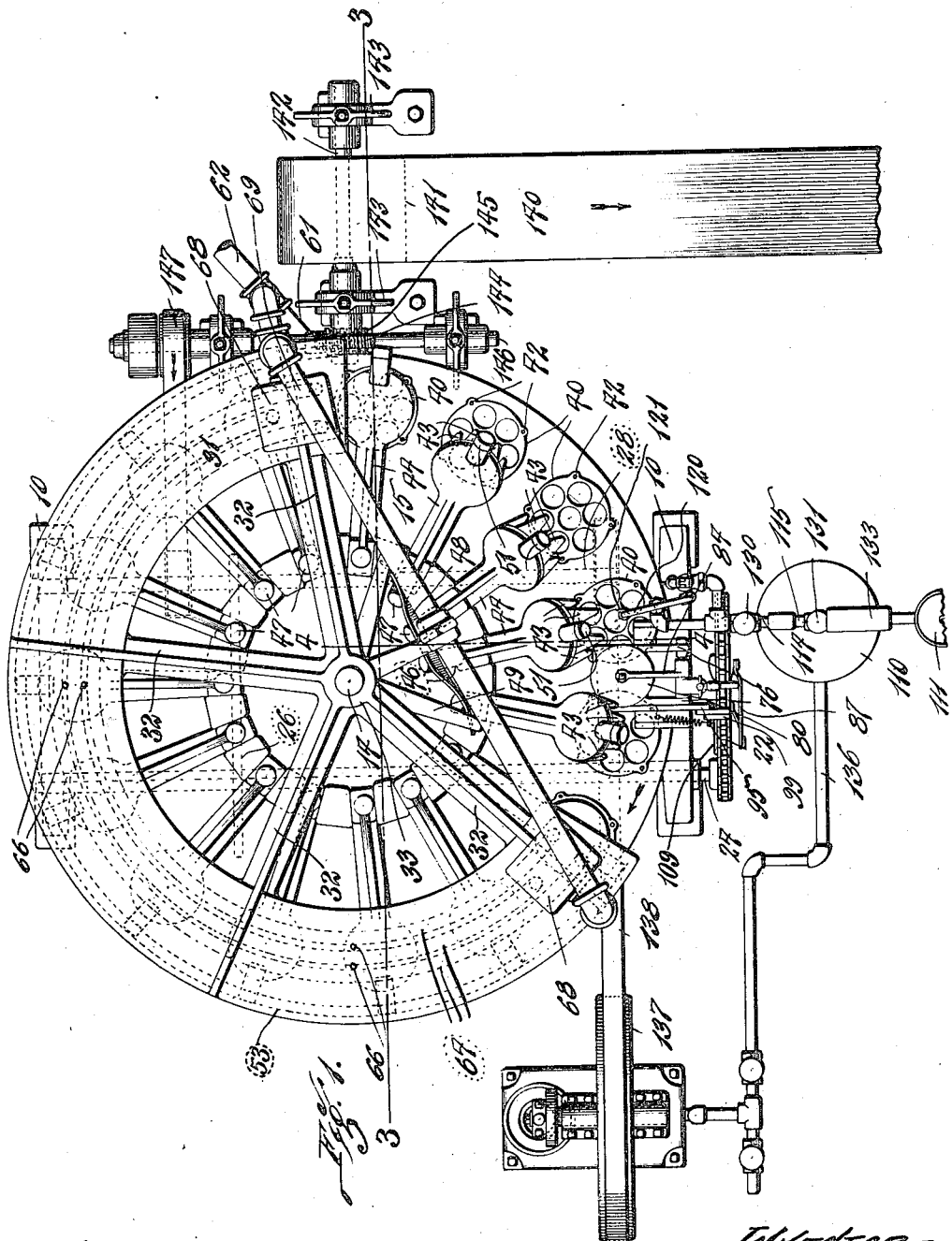

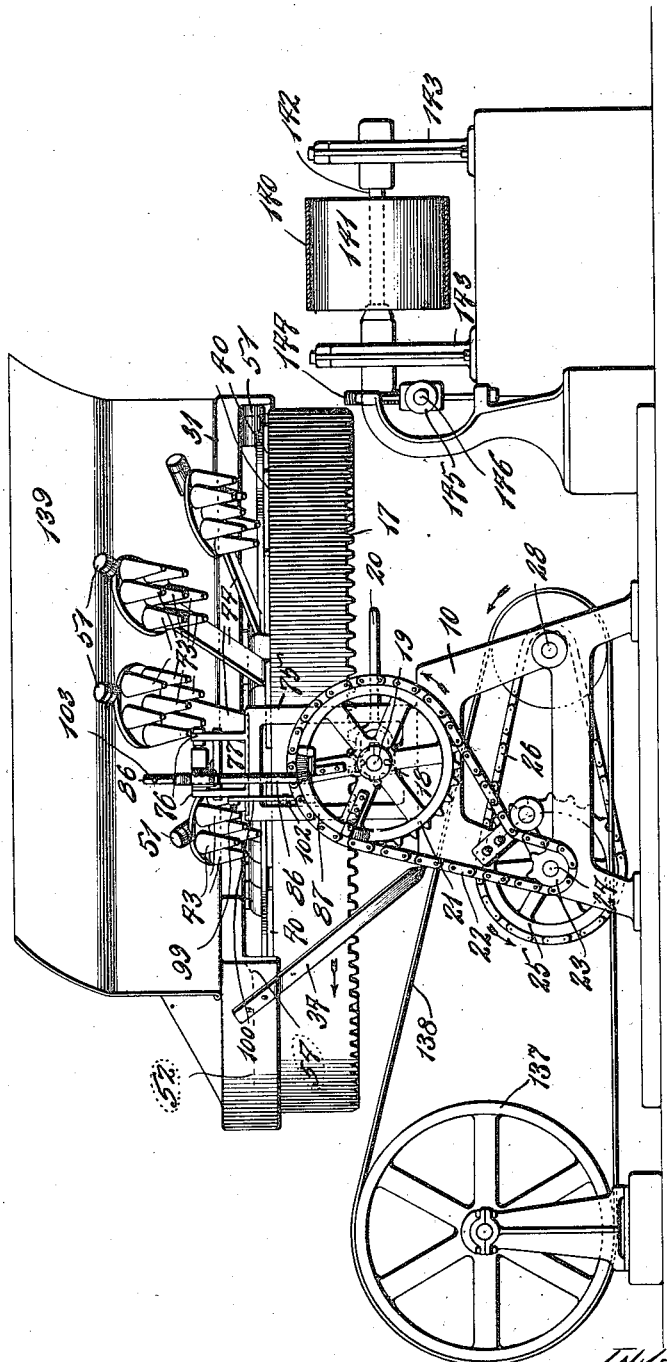

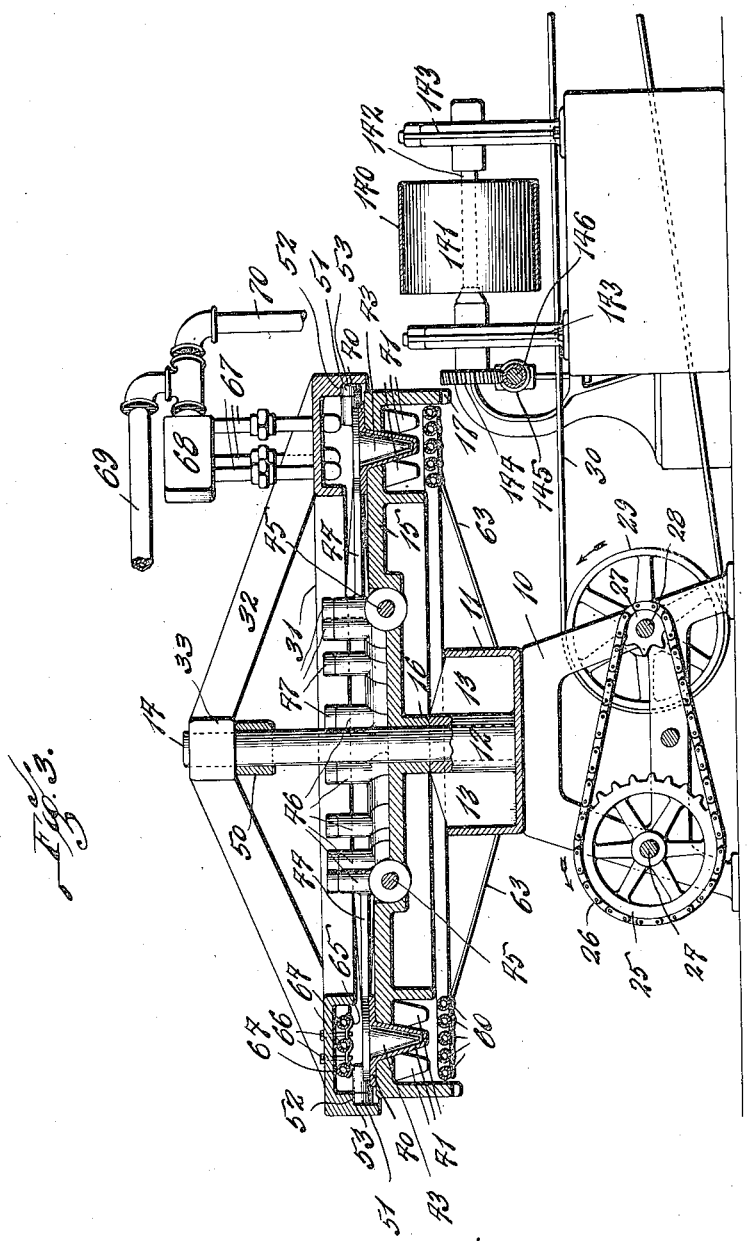

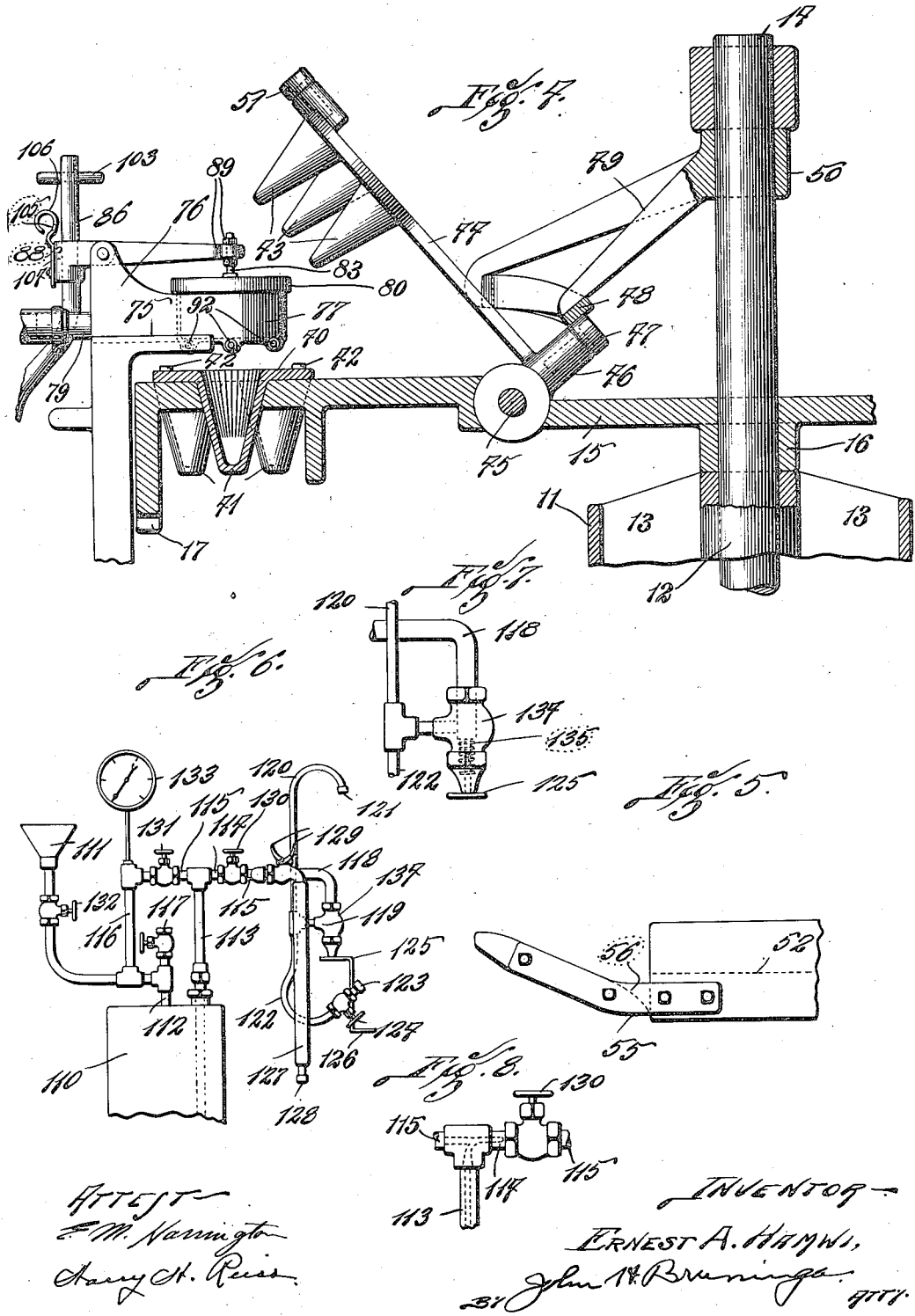

UNITED STATES PATENT OFFICE.

ERNEST A. HAMWI, OF ST. LOUIS, MISSOURI, ASSIGNOR TO AMERICAN CONE COMPANY, OF ST. LOUIS, MISSOURI, A CORPORATION OF MISSOURI.

PASTRY-CONE MACHINE.

1,281,159.

Specification of Letters Patent.

Patented Oct. 8, 1918.

Application filed March 13, 1915. Serial No. 14,233.

*To all whom it may concern:*

Be it known that I, ERNEST A. HAMWI, a citizen of the United States, and residing at St. Louis, in the State of Missouri, have invented a certain new and useful Improvement in Pastry-Cone Machines, of which the following is a specification.

This invention relates to pastry making machines and more particularly to machines for making ice cream cones.

In ice cream cone making machines, the paste or thin dough is poured into the molds with which coöperates cores forming a cone shaped cavity, and these molds and cores are then subjected to heat whereby the complete cone is baked. Since the paste requires mixing it, of course, contains many minute air bubbles which, under the action of the heat, enlarge to form blow holes in the cone. After the cone is baked it is apt to stick to the molds and cores and more especially to the cores, since these receive the smallest amount of heat.

One of the objects of this invention, therefore, is to provide a machine in which the blow holes are eliminated by the compression of the cores and molds relatively so as to make a uniform and homogeneous cone.

Another object is to provide means for breaking the connection between the cores and the molds, and the intermediate cone, so that the cone will be freed from both the molds and the cores.

The molds, as well as the cores must be greased, and this greasing should be uniform. This applies more especially to cores which, as stated above, do not receive the uniform heat that the molds do. This greasing is now usually done by hand with a brush, but this is not only unsatisfactory in that it takes time, but the grease cannot be spread uniformly.

Another object of this invention, therefore, is to provide automatic means for greasing the cores, as well as the molds, and more particularly, to provide means which will place the grease on the cores as well as the molds in the form of a fine spray.

Another object is to provide paste or dough feeding means which will accurately feed predetermined quantities of the paste into the molds, and which feeding means is susceptible of accurate regulation.

Another object is to combine with an automatic cone making machine a conveyer which receives the baked cones from the cone making mechanism, and which forms a unit with the cone making mechanism.

Another object is to improve the machine as to details, more especially as to the construction and operation of the heating means, the rotary mold and core carrier or support, and the actuating means for the cores.

Further objects will appear from the detail description taken in connection with the accompanying drawings, in which:

Figure 1 is a plan view of a machine embodying this invention;

Fig. 2 is a side elevation with the greasing mechanism removed;

Fig. 3 is a section on the line 3—3, Fig. 1;

Fig. 4 is a section on the line 4—4, Fig. 1;

Fig. 5 is a detail showing the mechanism for separating the cores from the molds;

Fig. 6 is a detail side elevation of the greasing mechanism;

Figs. 7 and 8 are enlarged details of Fig. 6.

Referring to the accompanying drawings, 10 designates the standards which support the bed 11 of the machine, which is of channel form. On the center of this bed is mounted a boss or hub 12 connected with the sides of the bed by webs 13. The boss or hub 12 is bored to receive a shaft or upright 14, and on this shaft is rotatably mounted a support or carrier 15 having a hub 16 resting on the hub 12. The periphery of this bed which is of channel form has a toothed flange 17 meshing with a gear 18 mounted on a shaft 19. This gear is adapted to be clutched to the shaft by a suitable clutch operated by a clutch lever 20. The shaft 19, which is mounted in suitable bearings on the bed 11, has fixed thereto a sprocket 21 connected by a chain 22 with a sprocket 23 on a shaft 24 mounted in bearings in the standards 10. The shaft 24 has mounted thereon a sprocket 25 connected by a chain 26 to a sprocket 27 fixed to a shaft 28, also mounted in bearings in the standards 10, and this shaft has mounted thereon a pulley 29 driven by a belt 30 from any suitable source of power. A hood 31 of inverted channel form is connected by radial arms 32 to a hub 33 fixed to the shaft 14 and also connected directly with the uprights 10 by braces 34. The hood 31 covers and extends over the rotary support 15 for a part of its circumference, but exposes a sector of this circumference, as shown in Figs. 1 and 2.

The support 15 has mounted thereon a series of molds 40 each comprising a group of cone shaped mold sections 41, preferably cast in one piece. These molds are secured in position by round headed screws 42 whose heads are smooth and one of which projects slightly above the surfaces of the molds. The molds are adapted to receive a series of coöperating mold members or cores 43 mounted in groups on bell crank levers 44, pivoted at 45 on the rotary support 15 and having each an arm 46 provided with a cam roll 47, adapted to engage a cam 48 mounted on arms 49 on a hub 50 fixed to the shaft 14. The free end of each arm 44 has a cam roll 51 which is adapted to take under a circumferential shoulder 52 on the outside flange 53 of the hood 31. The entrance to the hood is formed so that the circumferential shoulder 52 inclines or flares, as shown at 54, so as to engage the cam rolls 51 and force these cam rolls underneath the shoulder 52. The outlet of the hood is provided with a bracket 55 shaped to form an upwardly inclined cam face 56 which is adapted to engage the rolls 51 and separate the cores from the molds. The cam 48 is so positioned that the cam rolls 51 will leave this cam as the coöperating cores and molds are about to leave the hood, and so that the cam rolls 47 will start to engage the cam 48 as the cam rolls 51 are about to leave the bracket 55.

It will thus be seen that rotation of the support 15 will cause the cores to move into and out of the molds, and that the cores will be forced firmly into the molds as they enter the hood, while they will be freed or separated from the molds as they leave the hood.

Any suitable means may be employed for heating the molds. Mounted underneath the molds on the rotary support and extending circumferentially around the machine underneath the sector occupied by the hood, are a series of burner pipes 60 which are perforated to form jets adapted to direct a flame on the molds moving thereunder. These pipes are connected at their ends by a pipe 61 to a main supply pipe 62 leading from a suitable mixer or carbureter (not shown) which mixes or carburets the gas so as to supply the suitable mixture of gas and air to the burners. These pipes 60 may be supported over the frame of the machine in any suitable manner, as by braces 63. The hollow space in the hood 31 has mounted therein a series of pipes 64 similar in construction as the pipe 60, but perforated to direct the flames downwardly on the top of the cores. These pipes are supported from the hood, at intervals, by suitable braces 65, consisting of strips bent to conform to the pipes and supported from the roof of the hood by means of bolts 66. The burner pipes 64 receive the gas at each end through pipes 67 connected to chambers 68, one at each end of the hood, which chambers are connected by a pipe 69 receiving the carbureted gas from a pipe 70 connected to the main supply pipe 62. The molds and cores are thus heated from both sides, namely, from top and bottom, and these molds and cores are heated throughout their entire movement underneath the hood, and the heat is, moreover, uniform. By supplying the carbureted gas at both ends of the pipes, the pressure in these pipes will be uniform throughout their length.

Mounted on one of the standards 10 is a bracket 75 supporting the base 76 of a pastry feeding cylinder 77 to which the pastry is conducted, from a suitable source of supply, by means of a pipe 79, the cylinder being closed by a cap 80. A piston which is arranged to work within the cylinder has its rod 83 projected upward through the cap 80 and connected by adjustable nuts 89 with an arm 84 pivoted, at 85, on the base frame 76, the outer end of this arm being bored to receive a rod 86 adapted to engage a cam 87 on the sprocket 21.

The rod is movable vertically in the arm 84, but has a pin 88 engaging and sliding in a slot in the arm, whereby the rod is held against rotation. The rod has a grip 103 whereby it may be raised or lowered at will, and the pin 88 is adapted to snap into either one of a pair of recesses 104 and 105 in a yielding clip fixed at its lower end to the arm. The bottom of the cylinder is provided with a series of apertures corresponding in number to mold sections 41 and adapted to be normally closed by means of suitable valves 92 connected by a link 99 with an arm 100 pivoted between its ends in a bearing 102 and with its lower end disposed for engagement with a cam 109 on the inside of the sprocket 21.

During the operation of the machine, rotation of the sprocket 21 will cause the cams thereon to engage the arms 86 and 100, so as to depress the piston within the cylinder 77 and open the valves 92. As the piston descends, it will force the paste down, and the valves 92 will open after the piston reaches a certain point, so that a predetermined amount of paste will be forced through the valves. The stroke of the piston may be adjusted at any time by the nuts 89. In order to throw the feeding mechanism out of action the bar or arm 86 is raised so as to throw it out of engagement with the cam 87, and it is latched in that position by the engagement of the pin 88 with the recess 105.

The tank 110 is adapted to receive a suitable grease, such as olive oil. This tank has a pipe 112 by which it may be filled through the medium of a funnel 111. The pipe 113 extends to the bottom of the tank, and connects with the nozzle 114 of an aspirator discharging into a pipe 115. An air pipe 116 connects to the pipe 115 to discharge the air therein past the aspirator nozzle. A valve 117 is provided for the pipe 112. The pipe 115 connects by a pipe 118 with a valve casing 119 which in turn connects to a branch 120 having a downwardly directed nozzle 121. A branch 122 has an upwardly directed nozzle 123 controlled by a valve 124. The casing 119 contains a valve 134 held normally in closed position by a spring 135. The stem of this valve has an arm 125 provided with a laterally extending part 126 adapted to be engaged by the projecting heads of the screws 42 on the mold 40 as the carrier or support 15 rotates, so as to move the valve against the tension of its spring to open the same. A flexible tube 127 having a spraying nozzle 128 is connected with the pipe 115 through a hand operated valve 129. Valves 130, 131 and 132 are provided in the pipes and a gage 133 is provided for the pipe 116. The tank 110 is supplied by air under pressure through a pipe 136 connected through a suitable compressor 137 driven from the shaft 28 by a suitable belt 138.

The tank is filled, while the air in the tank is at atmospheric pressure, by opening the valves 117 and 132. Thereafter these two valves are closed and the valves 130 and 131 are opened. If now the valve 119 is opened, the air will issue through the pipes 112 and 116 into the pipe 115, past the aspirator nozzle 114, so as to draw grease from the bottom of the tank 110, through the pipe 113, and this grease is mixed with the issuing air and discharged in the form of a fine spray of air and grease from the nozzles 121 and 123. The nozzle 121 is positioned so as to throw the spray into the mold, while the nozzle 123 is positioned to throw the spray against the cores. A shield 139 is provided to catch the spray thrown against the cores. As the carrier or support 15 rotates, and as a pair of molds and cores come opposite the nozzles, the round head of the screw 40 will engage the part 126, open the valve 134 and throw a spray of grease into the mold and against the cores now opposite this spray. As soon as the screw head snaps out of engagement with the part 126, the valve is, of course, closed. The nozzle 128 on the flexible hose is provided so that any mold may be manually sprayed at pleasure. It will thus be seen that the greasing mechanism is either automatic or manual.

The conveyer 140 is driven by a suitable pulley 141 on a shaft 142 mounted in bearings 143 and driven by a worm wheel 144 and a worm 145 on the shaft 146. The shaft 146 is driven by a belt 147 from the shaft 28.

The conveyer is slightly below the level of the carrier, and is so positioned laterally of the carrier that the cones may be taken from the molds as these molds leave the hood, as the cores will rise out of the molds.

The general operation of the machine is as follows:

The rotary carrier is thrown into operation by actuation of the clutch lever 20. As this carrier rotates, the cores are moved into and out of the molds. As one of the molds comes opposite the greasing mechanism, the valve 134 is automatically opened by engagement of the pin 42 with the arm 126, and the nozzles 121 and 123 operate to throw the grease into the mold and against the cores in the form of a fine spray, so that this mold and these cores will be thoroughly and uniformly greased. The operator may, if the mechanism is not working perfectly, utilize the hand spray 127 to complete the greasing operation. The molds and cores, being now sprayed, move on, with the molds underneath the paste feeding mechanism, as shown in Fig. 4. The cams 87 and 109 now operate to actuate the piston and the valves of the paste feeding mechanism so that a predetermined amount of paste will be fed into each mold section 41. As the carrier moves on, the cores will move into the molds and spread the paste uniformly between the molds and the cores to form the cones. After the engaged molds and cores move under the hood, the cores are pressed downwardly to compress the paste and force out all of the air, so that the cone will be uniform and even, though it is of small thickness, there will be no blow holes. As the molds move under the hood the paste is baked gradually to the desired crispness. As the molds leave the hood the cam rolls on the ends of the core carriers come into engagement with the cam 56 which forcibly moves the cores partly out of the molds, so as to "break" the connection, these cones usually staying in the mold. The core carriers are then caught by the cam 48, which lifts them completely out of the mold, and the cones can then be removed and placed on the conveyer belt which conveys them to the trimming and cutting room.

It is obvious that various changes may be made in the details of construction without departing from the spirit of this invention. It is, therefore, to be understood that this invention is not to be limited to the specific construction shown and described.

Having thus described the invention, what is claimed is:

1. In a cone baking machine provided with heating means, a baking mold, a baking core coöperating therewith and separable therefrom, and means adapted to direct a spray of grease on said mold while separated.

2. In a cone baking machine provided with heating means, a baking mold, a baking core coöperating therewith and separable therefrom, and means adapted to direct a spray of grease on said core while separated.

3. In a cone baking machine provided with heating means, a baking mold, a baking core coöperating therewith, and means adapted to direct a spray of grease on said mold and said core.

4. In a cone baking machine provided with heating means, a movable support, baking molds mounted on said support, baking cores coöperating with said molds, operating means for moving said cores out of said molds, and means operating in timed relation with said operating means for directing a spray of grease on one of said coöperating members while the cores are out of the molds.

5. In a cone baking machine provided with heating means, a movable support, baking molds mounted on said support, baking cores coöperating with said molds, operating means for moving said cores out of said molds, and means operating in timed relation with said operating means for directing a spray of grease on both molds and cores while the cores are out of the molds.

6. In a cone baking machine provided with heating means, a movable support, baking molds mounted on said support, baking cores coöperating with said molds, operating means for moving said cores, means operating in timed relation with said operating means adapted to direct a grease spray on one of said coöperating members when the cores are out of the molds, and manually controlled means for directing a grease spray.

7. In a cone baking machine provided with heating means, a movable support, baking molds mounted thereon, baking cores coöperating with said molds and movable relatively thereto, means for preliminarily separating said cores from said molds, means operative to move the cores out of the molds, means for spraying grease upon one of the coöperating baking members and means for feeding batter thereto while separated.

8. In a cone making machine provided with heating means, a movable support, baking molds mounted thereon, baking cores coöperating with said molds and movable relatively thereto, means for preliminarily separating said cores from said molds, means operative to move the cores out of the molds, means for spraying grease upon both of the coöperating baking members and means for feeding batter thereto while separated.

9. In a cone baking machine provided with heating means, a movable support, baking molds mounted thereon, baking cores coöperating with said molds, means for separating the cores from the molds and maintaining them separated for a definite interval, means for directing a spray of grease upon one of said coöperating baking members while separated, and means for forcing said cores into said molds.

10. In a cone baking machine provided with heating means, a movable support, baking molds mounted thereon, baking cores coöperating with said molds, means for separating the cores from the molds and maintaining them separated for a definite interval, means for directing a spray of grease upon both of said coöperating members while separated, and means for forcing said cores into said molds.

11. In a cone baking machine provided with heating means, a movable support, baking molds mounted on said support, baking cores coöperating with said molds, operating means for moving said cores, means operating in timed relation with said operating means adapted to direct a grease spray on said cores when the latter are out of the molds, and a shield behind said cores.

12. In a cone baking machine provided with heating means, a movable support, baking molds mounted on said support, baking cores coöperating with said molds, means for moving said support, means for moving said cores out of said molds, means for spraying grease in fixed position with respect to said movable support, and means attached to each of said baking molds to cause said spraying means to operate to spray grease upon the baking members while the baking members are separated.

13. In a cone baking machine provided with heating means, a movable support, baking molds mounted on said support, baking cores coöperating with said molds, means for moving said support, means for moving said cores out of said molds, means for spraying grease in fixed position with respect to said movable support, and means attached to each of said baking molds to cause said spraying means to operate to spray grease upon one of the baking members while the baking members are separated.

In testimony whereof I affix my signature in the presence of these two witnesses.

ERNEST A. HAMWI.

Witnesses:
J. H. BRUNINGA,
GEORGE S. TOURVILLE.